Aug. 23, 1966 R. K. LITTLE 3,268,201
POSITIVE OPENING PINCH VALVE
Filed Nov. 16, 1962 2 Sheets-Sheet 1

INVENTOR:
ROBERT K. LITTLE
BY
Howson & Howson
ATTYS.

Aug. 23, 1966   R. K. LITTLE   3,268,201
POSITIVE OPENING PINCH VALVE
Filed Nov. 16, 1962   2 Sheets-Sheet 2

INVENTOR:
ROBERT K. LITTLE
BY Howson & Howson
ATTYS.

United States Patent Office 3,268,201
Patented August 23, 1966

3,268,201
POSITIVE OPENING PINCH VALVE
Robert K. Little, Burlington County, N.J., assignor to RKL Controls, Inc., Hainesport, N.J., a corporation of New Jersey
Filed Nov. 16, 1962, Ser. No. 238,185
5 Claims. (Cl. 251—8)

The present invention relates generally to pinch-type valves and more particularly to an elastomeric pinch valve body having a flexible integral tab portion molded therein by which a positive opening of the valve may be effected.

A common problem with pinch valves is the failure of the elastomeric valve body to open fully after being closed for an extended length of time. Depending upon the valve body material, the body will to some degree assume a "set," preventing the body from opening to the maximum flow section. In most situations, the fluid pressure in the valve will act to fully open the body. However, when the pressure in the valve is slight or negative, an external force is required to assure a complete valve opening.

Previous attempts to develop a positive opening body have employed metal lugs in the valve body attached to the valve actuating elements. Such attempts have failed in that the inflexible lugs have torn out of the elastomeric valve body. To overcome this problem, the present invention is characterized by integrally molded flexible tabs extending from the valve body which distribute the body-opening force over a wide area of the body. Opening of the valve with such an arrangement may be closely controlled and a maximum opening may be obtained regardless of the pressure within the valve.

Accordingly it is one object of the present invention to provide a pinch valve which may be positively opened to the desired opening despite prolonged periods of closure and regardless of the pressure and flow conditions in the valve.

A further object of the invention is to provide a pinch valve construction wherein the valve body includes integrally molded flexible tabs attached to the valve actuating elements to permit a positive opening of the body.

Additional objects and advantages of the invention will be more readily apparent from the following detailed description of an embodiment thereof when taken together with the accompanying drawings in which.

Figure 1:
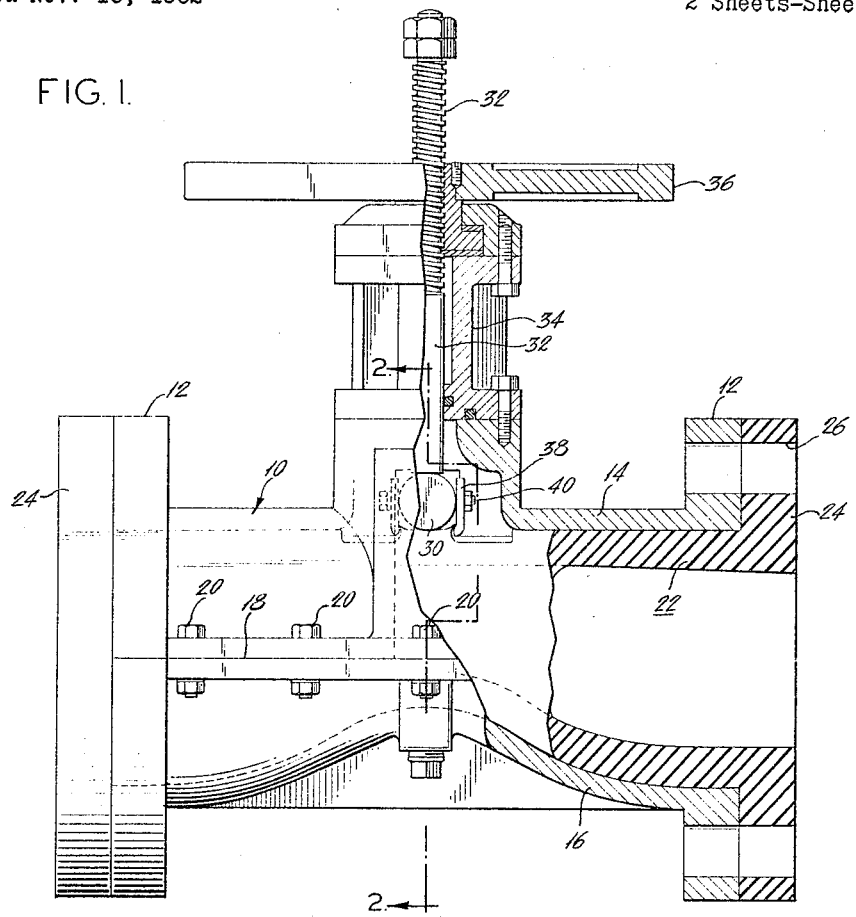
FIG. 1 is a longitudinal view partly in section of a positive opening pinch valve embodying the present invention.

Referring to the drawings, FIG. 1 shows a pinch valve having a substantially cylindrical casing 10 terminating in flanged ends 12. The casing comprises upper and lower casing members 14 and 16 which are joined along flanged joint 18 secured by bolts 20.

An elastomeric valve body 22 is fitted within the casing 10 and includes flanged ends 24 adapted to overlie the flanged ends 12 of the casing. Bolt holes 26 in the flanged ends 12 and 24 permit fastening of the valve to a similarly flanged end of a conduit member.

Figure 2:
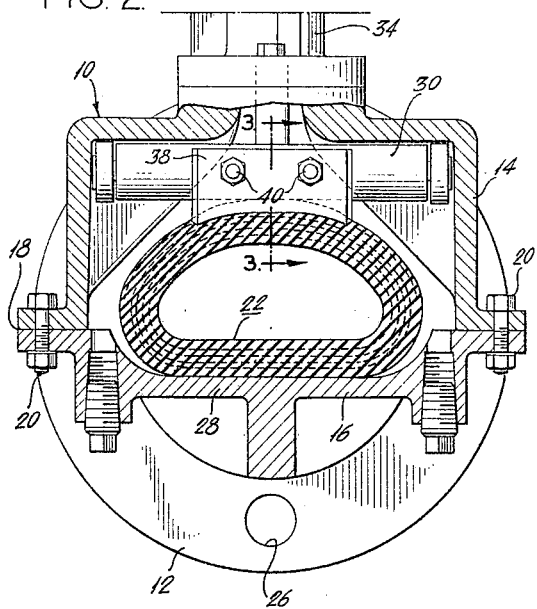
FIG. 2 is a sectional view taken along line 2—2 of FIG. 1.
Figure 3:
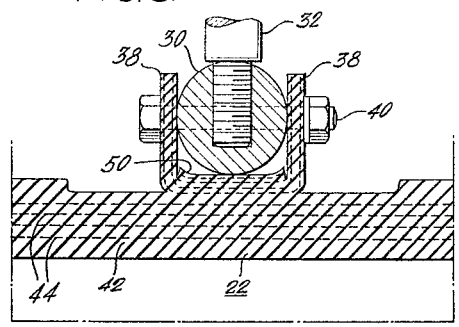
FIG. 3 is a sectional view taken along line 3—3 of FIG. 2.
Figure 4:
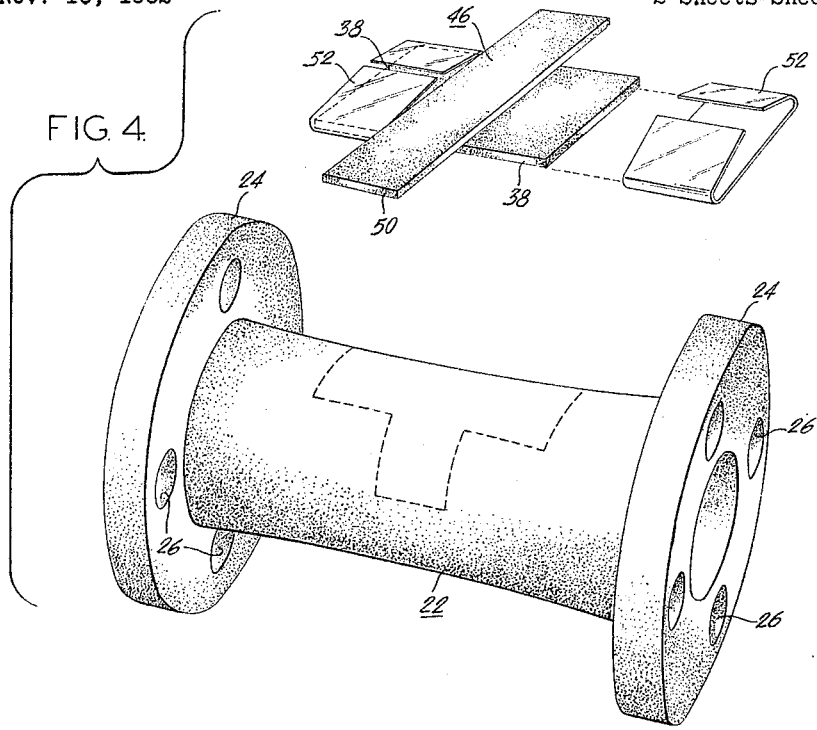
FIG. 4 is an exploded view showing the valve body tab elements and manner in which they are applied to the valve body prior to the final molding of the body assembly.

As shown in FIG. 1 and 2, the lower casing member 16 is curved upwardly to provide a flat central support 28 for the valve body 22. Opposed from the support 28 is upper pinch bar 30 controlled by the threaded valve stem 32. The valve stem is supported in sealed relation within the valve bonnet 34 and is vertically actuated by the threaded hand wheel 36 rotatably secured within the top of the valve bonnet.

Closing of the valve is effected by lowing the upper pinch bar to clamp the valve body between the upper pinch bar and the support 28. After an extended period in such a pinched condition, the valve body generally will not return to the fully opened position when the pinch bar is raised, the body assuming a set which is not immediately overcome by fluid pressures within the valve. Accordingly, under such conditions and particularly when the valve is used with low or negative pressures, it is necessary that means be provided to connect the valve body with the pinch bar to effect a positive opening of the valve.

In the present invention, tabs 38 integrally molded into the valve body are attached to the upper pinch bar by bolts 40. The structure and manner in which the tabs are integrally molded is a primary aspect of the invention. Inasmuch as a considerable force must be exerted on the tabs to open the valve body following conditions of prolonged closure, the tabs must be firmly anchored to the valve body but canot detract from the strength of the body.

To provide the necessary strength, the valve body is developed in the manner illustrated in FIGS. 4–7. Referring to the sectional portion of FIG. 5, the elements involved in building up the valve body are seen to include a cylindrical section of uncured rubber 42 which is placed on a mandril abutted by radially disposed end plates. Over the rubber layer 42 are laid a series of frictioned and skimmed or rubber-coated fabric layers 44, the end of which are bent up along the end plates to form the flanged ends 24 of the valve body. Saddled over the substantially cylindrical central portion of the body is the tab assembly 46 which includes the flat tab element 38 superposed axially on the body, and the overlying belly band 50 disposed perpendicularly to the tab element extending circumferentially approximately 180 degrees around the body. As shown in the sectional views of the drawings, the tab element and belly band are also of frictioned and skimmed or a rubber-coated fabric and preferably include several fabric layers.

Separator strips 52 of plastic such as Du Pont Teslar are wrapped around the tab portions of the tab element which are not overlapped by the belly band 50.

Figure 6:
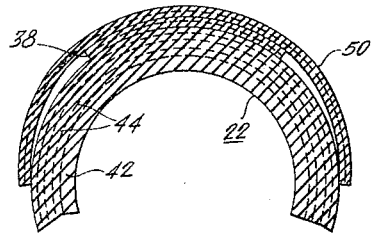
FIG. 6 is a sectional view taken along line 6—6 of FIG. 5.
Figure 7:
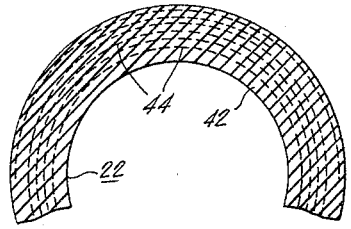
FIG. 7 is a view as in FIG. 6 following molding of the valve body.
Figure 5:
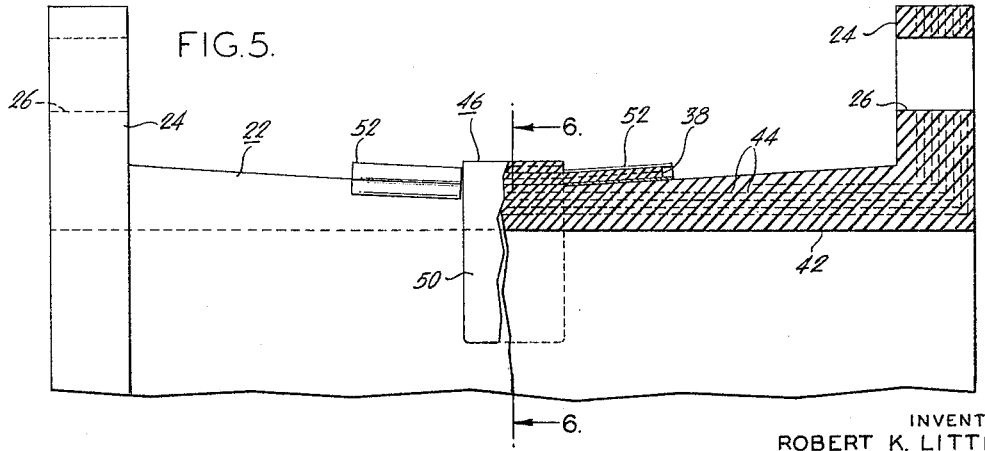
FIG. 5 is a longitudinal view partly in section of the pinch valve body of FIG. 4 with the tab elements in position prior to the final molding of the assembly.

The tab element, belly band, and separators are positioned on the cylindrical skimmed fabric layered assembly as shown in FIGS. 5 and 6 and a skin layer of uncured rubber is wrapped around the entire assembly, heat and pressure then being applied to the assembly in a molding and curing operation to produce the smoothly finished fully cured cylindrical valve body shown in FIG. 7.

Following the molding and curing operation, cuts are made in the valve body through the skin layer to free the tabs 38 which the separator strips 52 prevent from fusing into the valve body during molding and curing. The flexible tabs are readily bent into a parallel vertical disposition along the upper pinch bar 30 to which they are secured by bolts 40.

The tab elements distribute the upward force of the pinch bar over a wide surface area of the valve body through the belly band which extends over a substantial circumferential area of the valve body. Due to the flexibility inherent in a tab structure of integrally molded elastomeric material, there is no development of local stress concentration which might tear the tabs from the body structure. The molding of the tab element fabric layers beneath the belly band fabric layers which are integrally molded into the valve body provides a tab construction of unusual strength.

With pinch valves having lower as well as upper movable pinch bars, it is obvious that the present tab construction may be duplicated on the lower side of the valve body to provide a positive opening of the body from above and below.

Manifestly, variations and changes in details of construction from that illustrated as the preferred embodiment can be effected by those skilled in the art without departing from the spirit and the scope of the invention as defined in and limited solely by the appended claims.

I claim:

1. A positive opening unitary elastomeric pinch valve body comprising a substantially cylindrical elastomeric body portion, rubber-coated fabric layers reinforcing said body portion, a rubber-coated fabric tab element, a rubber-coated fabric belly band, said belly band overlying a portion of said tab element exposing at least one tab, the exposed tab extending in flexible disposition from the body, fabric of the tab element passing between the fabric of the belly band and body portion.

2. A positive opening unitary elastomeric pinch valve body comprising a substantially cylindrical elastomeric body portion, said body portion including rubber coated fabric reinforcing layers, a rubber-coated fabric tab element on the outer surface of said body portion, a rubber-coated fabric belly band on the outer surface of said body portion, said belly band overlying a portion of said tab element, an exposed portion of said tab element comprising a tab by means of which a positive opening force may be applied to the valve body, the tab extending in flexible disposition from the body, the fabric of the tab element being interwoven between the fabric of the belly band and body portion.

3. A valve body as claimed in claim 2 wherein said belly band extends substantially 180 degrees circumferentially around the valve body.

4. In a pinch valve comprising a valve casing, an elastomeric valve body defining a fluid flow path disposed within the casing, a pinch bar movably mounted in the casing, means for effecting movement of the pinch bar against the valve body to control the fluid flow through the valve body, the improvement providing a positive opening of the valve body comprising: a rubber-coated fabric flexible tab extending from the elastomeric valve body secured to the pinch bar, the fabric of said flexible tab passing under at least one fabric layer of the valve body to provide an integrally molded tab.

5. In a pinch valve comprising a valve casing, an elastomeric valve body defining a fluid flow path disposed within the casing, a pinch bar movably mounted in the casing, means for effecting movement of the pinch bar against the valve body to control the fluid flow through the valve body, the improvement providing a positive opening of the valve body comprising: a rubber-coated fabric tab element on the outer surface of said pinch valve body, part of said tab element comprising a flexible tab extending from the valve body, said flexible tab secured to the pinch bar, a rubber-coated fabric belly band overlying a portion of said element, said belly band and overlaid portion of said tab element being integral with the valve body.

References Cited by the Examiner

UNITED STATES PATENTS

| 1,424,386 | 8/1922 | Stoner | 18—53 |
| 1,931,320 | 10/1933 | Haushalter | 251—8 |
| 2,212,733 | 8/1940 | Grigsby | 251—8 |
| 2,310,619 | 2/1943 | Dillehay | 18—53 |
| 2,324,880 | 7/1943 | Rogers et al. | 251—331 |
| 2,684,829 | 7/1954 | McFarland | 251—331 |
| 3,134,571 | 5/1964 | Boteler | 251—331 |

FOREIGN PATENTS

| 503,291 | 1930 | Germany. |

WILLIAM F. O'DEA, *Primary Examiner.*

ISADOR WEIL, *Examiner.*

R. GERARD, *Assistant Examiner.*